July 10, 1962 B. W. HATTEN ET AL 3,043,970
MOTOR SUPPORT AND VIBRATION ISOLATION MEANS
Filed Oct. 13, 1959
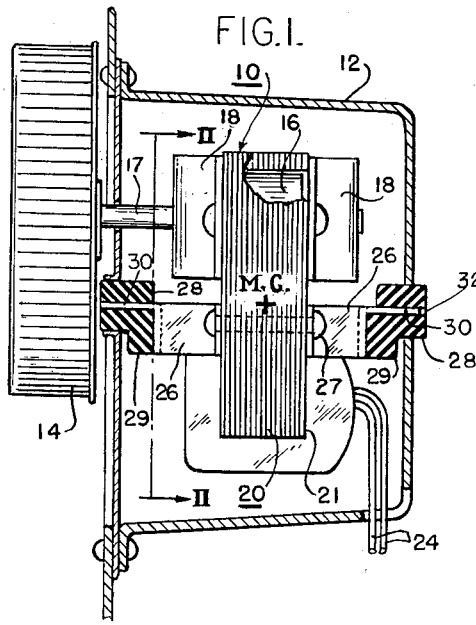
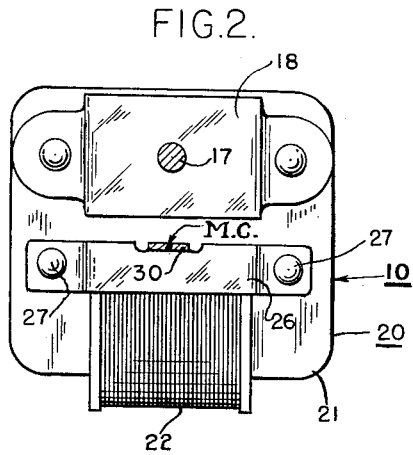
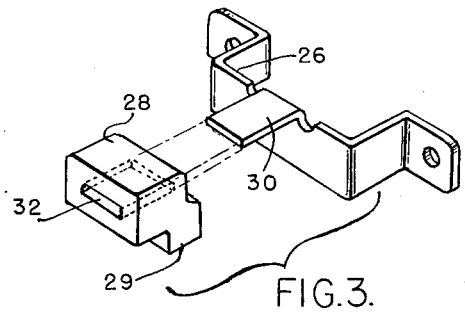
INVENTORS
BERNARD W. HATTEN
WILLIAM A. GALLAER
BY *William J. Foley*
ATTORNEY

United States Patent Office 3,043,970
Patented July 10, 1962

3,043,970
MOTOR SUPPORT AND VIBRATION
ISOLATION MEANS
Bernard W. Hatten and William A. Gallaer, Columbus, Ohio, assignors to Westinghouse Electric Corporation, East Pittsburgh, Pa., a corporation of Pennsylvania
Filed Oct. 13, 1959, Ser. No. 846,142
4 Claims. (Cl. 310—91)

This invention relates to induction motors, especially fractional horsepower induction motors of the shaded pole type, and more particularly to mounting means therefor.

Shaded pole induction motors are in wide usage today, especially where economical, fractional horsepower motors are required. For example, they are used in small fans which circulate cold air in domestic refrigerators.

Fractional horsepower induction motors are characterized generally as employing a rectangular, or near rectangular, stator core which functions as the main frame for the motor and which has a stator winding on one leg thereof and has the rotor mounted in the opposite leg for rotation about an axis disposed normal to the core. The rotor axis is, therefore, displaced from the geometric center of the motor and because the single stator winding is positioned on the opposite side of the motor the mass center of the motor is displaced a considerable amount from the rotor axis of rotation. Also characteristic of these motors is the low frequency vibrational disturbance that originates from them, mostly in the torsional mode of vibration; and this disturbance usually causes objectionable noises to emanate from the panel or other structure on which they are supported.

In refrigerators, for example, it has been the practice heretofore to mount fans incorporating shaded pole motors on a panel or wall by a pair of mounting bolts, or studs, passing through the stator core. These bolts were arranged on opposite sides of the rotor axis and offset from the mass center of the motor. Rubber washers have been interposed between the bolt heads and the mounting surface of the cabinet, to provide a measure of resilience to the mounting arrangement, in attempts to reduce the transmission of audible vibrational disturbances from the motor to the wall. This prior practice has not been entirely effective and very high quality motors have been required to make a quiet running product. It is the principal concern of the present invention, therefore, to provide, for fractional horsepower induction motors of the aforementioned type, an improved mounting arrangement which more effectively reduces the transmission of torsional vibrations from the motor to a supporting structure so that less expensive motors of this type may be used in applications where quietness is of prime importance.

In accordance with this invention, the motor is mounted on a supporting structure by means including a member which is non-rotatably secured to the stator and which has a projection of non-circular cross section extending in an axial direction on a line passing through the mass center of the motor. Preferably, there are a pair of such projections which extend in opposite directions from the motor. Each of the projections is received in a resilient element or grommet which is carried by the supporting structure and has a socket formed therein for receiving its associated projection in non-rotatable relationship.

The resilient elements of the mounting arrangement provide sufficient flexibility in a torsional direction to give the system a natural frequency which is appreciably lower than the frequency of the objectional motor vibrations, whereby resonant conditions are avoided. With the improved mounting arrangement, the limited amount of torsional deflection permitted is sufficient to dissipate vibrational energy at or near its origin before it is transmitted to the supporting structure.

Furthermore, having the mounting projections substantially in alignment with the mass center of the apparatus is advantageous, since shocks received during transportation are less likely to impose large torsional forces on the mounts than in the case where motor mounts are offset from a line passing through the mass center.

The various objects, features and advantages of the present invention will be apparent from the following description and claims, taken in connection with the accompanying drawing, forming a part of this application, in which:

FIG. 1 is a view, partly in side elevation and partly in vertical section, of blower apparatus including a motor mounted in accordance with the invention;

FIG. 2 is a vertical sectional view taken through the mounting means along line II—II of FIG. 1 and showing the motor in front elevation; and FIG. 3 is an exploded, perspective view of a mounting bracket and a grommet shown in FIG. 1.

The invention, as shown, is applied to a shaded pole induction motor, generally indicated by the numeral 10, which is housed and supported by wall structure 12. For the purpose of illustration, the motor 10 is used to drive a fan 14 of the type employed for circulating air in a domestic refrigerator.

The motor 10 comprises a rotor 16 mounted on a shaft 17 which is suitably journaled in a pair of end covers 18 and surrounded by a stator 20. The latter comprises a core 21 of stacked laminations disposed normal to the rotor axis and about which a coil 22 is wound. A pair of leads 24 conduct electrical energy to the coil 22. It is characteristic of this type of motor that the rotor axis is appreciably offset from the mass center of the motor, the location of which is indicated at M.C. on the drawings.

The motor 10 usually operates on 60 cycle, alternating current and, consequently, the magnetic forces acting on the rotor 16 becomes zero during a transient condition which occurs 120 times per second. This produces an alternating disturbance of low frequency which should be isolated from the supporting wall structure 12 if the assembled product is to operate quietly. Unlike prior arrangements which connect the motor 10 to supporting structure in such a manner that the vibrational energy from the disturbance cannot be dissipated, the present invention provides a mounting arrangement which permits torsional deflection of the motor relative to the supporting wall structure 12 about a vibrationally neutral axis extending through the mass center of the motor.

According to the present invention, the motor 10 is mounted on the wall structure 12 by an improved mounting arrangement comprising a pair of generally U-shaped, sheet metal brackets 26 and a pair of resilient elements, or grommets, 28. The brackets are disposed on opposite sides of the stator 20 and are secured at their ends by rivets 27 which extend through the stator core laminations. Each bracket 26 includes a tab 30 which is bent from the upper edge of the middle thereof so as to project in an axial direction away from the motor. The tabs 30 of the two brackets 26 project in opposite directions and generally away from the mass center of the motor 10. In other words, the brackets are, in accordance with this invention, so positioned on the motor that a centerline passing through both tabs 30 also passes through the center of mass of the motor. Such a centerline should also extend parallel to the axis of rotation of the motor rotor 16.

The tabs 30 are connected to the wall structure 12 through the grommets 28, which are preferably constructed from rubber, rubber-like plastic, or some other elastomeric material, especially those that can be molded.

The grommets 28 are each provided with a socket 32 corresponding in shape to the tab 30 while the outside of the grommet 28 is suitably shaped to fit in, and seal, openings provided in the wall structure 12. The tabs 30 are rectangular in cross section but in the broad sense of the invention, a member having any non-circular cross-sectional shape may be employed. It is the primary function of the tabs 30 and the grommets 28 to provide a non-rotatable, flexible connection between the motor 10 and the wall structure 12. Each grommet 28 is also, preferably, provided with an integral, depending pad 29 which is disposed between the face of its bracket and the surface through which it projects. The pads 29 limit axial movement of the motor 10 with respect to the wall structure 12 and prevent the bracket 26 from contacting the wall structure.

The single axis resilient mounting of this invention, wherein the motor is supported at two points, front and rear, on a line parallel to the rotor axis and passing through the mass center of the motor, provides the unusual degree of torsional flexibility by which extreme quietness of operation is achieved.

The principal effect of the mounting system is the isolation of low frequency vibrations resulting from the sixty cycles per second alternating current by which the motor is powered. This alternating current produces a 120 cycles per second pulsating torque on the motor core 21, which torque acts about the axis of the rotor 16. It might seem logical to provide a mounting arrangement for the motor that is torsionally flexible about an axis coinciding with the axis of the motor rotor. It has been determined, however, that this torque pulsation can be handled equally well if, in accordance with this invention, the mounting arrangement provides torsional flexibility about an axis passing through the center of mass of the motor. The single axis mounting of this invention is sufficiently flexible to permit this torque pulsation to be dissipated through torsional movement of the motor 10. The transmission and subsequent transducement into audible sounds of this low frequency vibration is, therefore, effectively prevented, and it follows that the final product will be quiet running.

The improved mounting system results in the combined torsional natural frequency of the motor 10 and its mounting being well below the 120 cycles per second exciting frequency, so that resonant conditions which could produce excessive movement of the motor 10 and high transmission of vibration to the wall structure 12 are avoided.

At the same time, additional beneficial results are obtained. The simplicity of the present mounting arrangement as compared to one devised to provide torsional flexibility about the rotor axis should be apparent. It is also to be noted that the present mounting arrangement is less subject to damage from shock inertia forces which might be imposed on the motor during shipment and handling of the product in which the motor is mounted. With the present mounting, inertia loads of this type, which act through the mass center of the motor, impose radial and/or longitudinal forces, rather than torsional forces, on the mounting tabs 30 and the grommets 28. A mounting system having the flexibility of the arrangement herein disclosed, but which supported the motor on an axis other than that passing through the mass center, would undoubtedly be subjected to large torsional shock load forces which could damage the mounting or cause excessive movement of the motor.

It can readily be appreciated, of course, that the resilient grommets 28 are capable of isolating other vibrational disturbances originating in the motor 10, including torsional mode disturbances about other axes as well as the various translational mode disturbances.

From the foregoing it will be apparent that improved mounting means for fractional horsepower induction motors has been provided which not only isolates or damps out high frequency sounds in a well-known manner but also provides means for dissipating low frequency vibrational disturbances inherent in motors of this type so that they will produce less audible noises in the products to which they are applied.

While the invention has been shown in but one form, it will be obvious to those skilled in the art that it is not so limited, but is susceptible of various changes and modifications, without departing from the spirit thereof.

What is claimed is:

1. The combination with a fractional horsepower motor of the type having a stator and a rotor the axis of rotation of which is offset appreciably from the mass center of the motor, of vibration isolating means for supporting said motor, said means comprising a pair of tabs which are non-circular in cross section carried by and projecting away from said motor, said tabs being positioned so that a line passing therebetween passes through the mass center of said motor and is parallel to the axis of rotation of said rotor, and a pair of grommets formed of elastomeric material and disposed, respectively, on said tabs, said grommets having internal configurations conforming to the configuration of said tabs and having non-circular external configurations corresponding to openings in the structure in which said motor is adapted to be mounted, said means flexibly supporting said motor for torsional movement about an axis passing through the mass center of the motor and disposed parallel to and spaced from the axis of rotation of the motor rotor.

2. The combination with a fractional horsepower motor of the type having a stator and a rotor the axis of rotation of which is offset appreciably from the mass center of the motor, of vibration isolating means for supporting said motor, said means comprising a pair of brackets disposed in opposite sides of said stator, each of said brackets having a tab which is non-circular in cross section formed therein and projecting away from said motor in a direction generally parallel to said rotor axis, said tabs being positioned so that a line passing therebetween passes through the mass center of said motor and is parallel to the axis of rotation of said rotor, and a pair of grommets formed of elastomeric material and disposed, respectively, on said tabs, said grommets having internal configurations conforming to the configuration of said tabs and having non-circular external configurations corresponding to openings in the structure in which said motor is adapted to be mounted, said means flexibly supporting said motor for torsional movement about an axis passing through the mass center of the motor and disposed parallel to and spaced from the axis of rotation of the motor rotor.

3. The combination with a fractional horsepower motor of the type having a stator and a rotor the axis of rotation of which is offset appreciably from the mass center of the motor, of vibration isolating means for supporting said motor, said means comprising a pair of U-shaped brackets secured to opposite sides of said stator, each of said brackets having a tab which is non-circular in cross section formed in a middle portion thereof and projecting away from said motor in a direction generally parallel to said rotor axis, said tabs being positioned so that a line passing therebetween passes through the mass center of said motor and is parallel to the axis of rotation of said rotor, and a pair of grommets formed of elastomeric material and disposed, respectively, on said tabs, said grommets having internal configurations conforming to the configuration of said tabs and having non-circular external configurations corresponding to openings in the structure in which said motor is adapted to be mounted, said means flexibly supporting said motor for torsional movement about an axis passing through the mass center of the motor and disposed parallel to and spaced from the axis of rotation of the motor rotor.

4. The combination with a fractional horsepower motor of the type having a stator and a rotor the axis of rotation of which is offset appreciably from the mass center of the motor, of vibration isolating means, and structure for supporting said motor, said means comprising a pair of oppositely extending members disposed on opposite sides of said stator with the mass center of the motor positioned on a line between them which is spaced from an extends generally parallel to said axis of rotation, each of said members including a resilient element which is non-rotataby connected to said stator and to said structure so as to permit limited torsional deflection of said motor about said line.

References Cited in the file of this patent

UNITED STATES PATENTS

| | | |
|---|---|---|
| 1,778,992 | Wulfert | Oct. 21, 1930 |
| 2,127,979 | Loftis | Aug. 23, 1938 |
| 2,269,245 | Blessing | Jan. 6, 1942 |
| 2,732,724 | Tateishi | Jan. 1, 1956 |
| 2,928,961 | Morrill | Mar. 15, 1960 |